Dec. 22, 1953  C. A. ELLIS  2,663,219
OPHTHALMIC INSTRUMENT
Filed Dec. 30, 1950  3 Sheets-Sheet 1

INVENTOR
CHARLES A. ELLIS
BY
Louis K. Gagnon
ATTORNEY

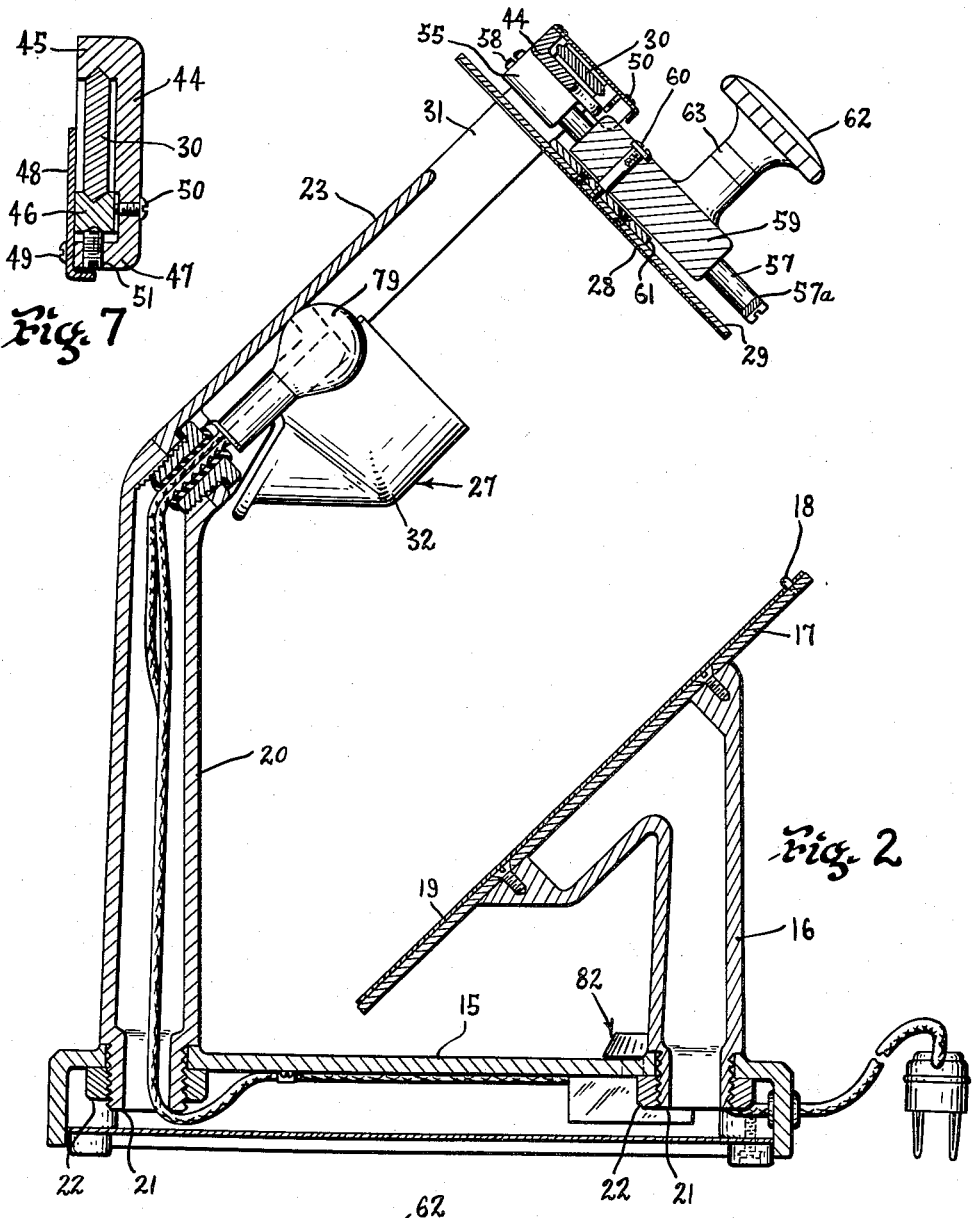

Dec. 22, 1953  C. A. ELLIS  2,663,219
OPHTHALMIC INSTRUMENT
Filed Dec. 30, 1950  3 Sheets-Sheet 3
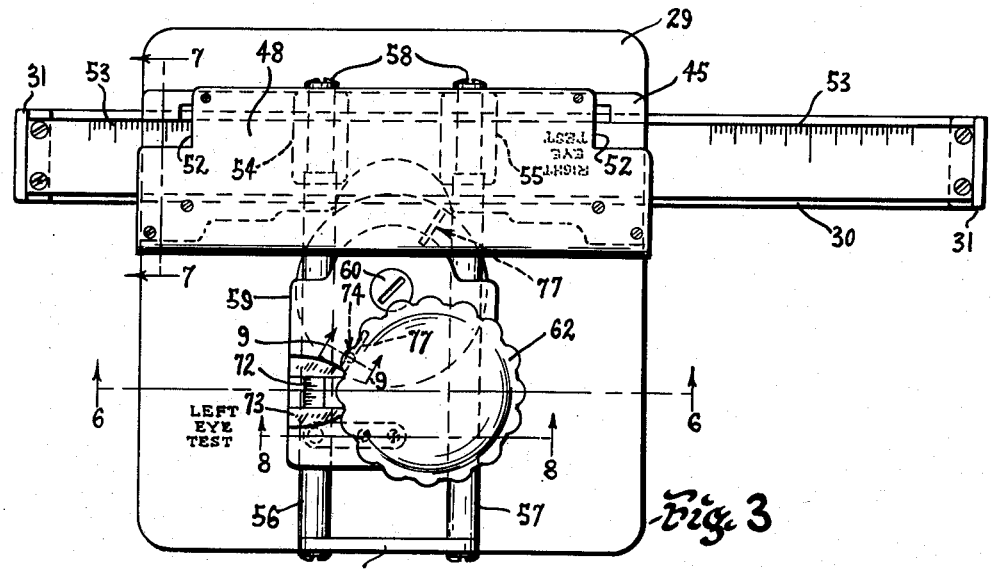
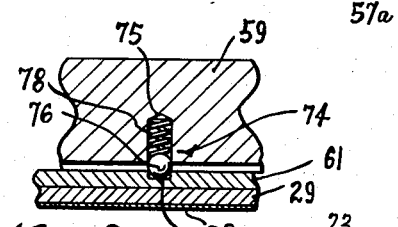
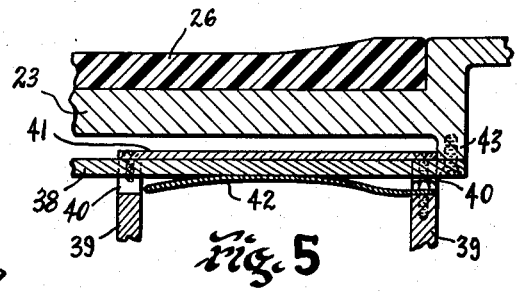
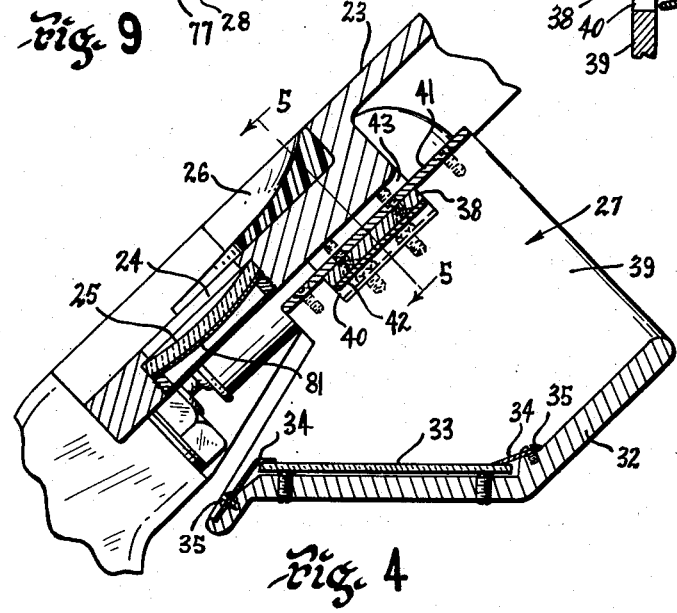
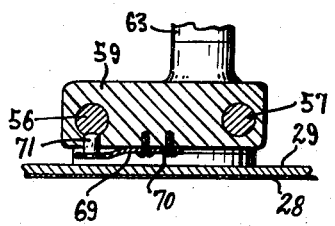
INVENTOR
CHARLES A. ELLIS
BY
Louis L. Gagnon
ATTORNEY Patented Dec. 22, 1953

2,663,219

UNITED STATES PATENT OFFICE 2,663,219

OPHTHALMIC INSTRUMENT

Charles A. Ellis, Southbridge, Mass., assignor to American Optical Company, Southbridge, Mass., a voluntary association of Massachusetts Application December 30, 1950, Serial No. 203,661

7 Claims. (Cl. 88—20)

1

This invention relates to ophthalmic instruments and has particular reference to an improved instrument of the type used particularly for determining the limits of the central and paracentral visual fields.

One of the principal objects is to provide an instrument of the above nature for determining the limits of central or paracentral visual fields, whereby the operator can more easily and efficiently perform the necessary functions involved in making such tests.

Another object is to provide in an eye testing instrument of the above character, a pair of separate test charts or fields positioned so as to permit viewing by the patient, one chart for each eye, with one of said charts positioned so as to be viewed directly by one eye and with the other chart positioned above and in front of the patient so as to be viewed through use of a mirror by the other eye, the arrangement permitting the operator free access to the first of said charts from a position in front of the patient or at either side.

Another object is to provide, in an instrument of the above character, means for determining and measuring deviations from normal of the line of sight such as those caused by muscular imbalance.

Another object is the provision of an instrument of the above character wherein the mirror for reflecting the image of the upper of said charts to one of the patient's eyes is supported by a novel, simple and efficient adjustable means including reference scales whereby it may be quickly and easily positioned as desired before the particular eye which is not being tested.

Still another object is the provision of an instrument of the above character which is comparatively simple and easy to use, efficient, compact and relatively inexpensive to manufacture.

Other objects and advantages will become apparent from the following description taken in connection with the accompanying drawings, in which:

Fig. 2 is a vertical sectional view taken on line 2—2 of Fig. 1 looking in the direction of the arrows;

Fig. 3 is a rear elevational view of the upper chart arrangement;

Fig. 4 is a fragmentary sectional view taken on line 4—4 of Fig. 1;

Fig. 5 is a fragmentary sectional view taken on line 5—5 of Fig. 4 looking in the direction of the arrows;

2

Figure 10:
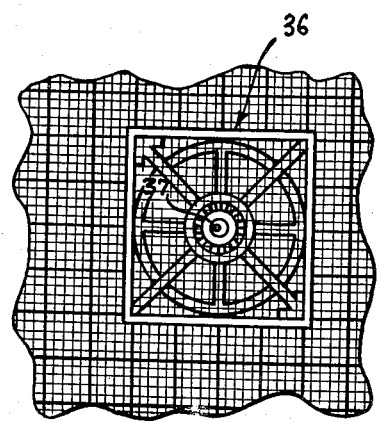

Fig. 6 is a fragmentary sectional view taken on line 6—6 of Fig. 3 looking in the direction of the arrows;

Fig. 7 is a sectional view taken on line 7—7 of Fig. 3 looking in the direction of the arrows;

Fig. 8 is a fragmentary sectional view taken on line 8—8 of Fig. 3;

Fig. 9 is a fragmentary sectional view taken on line 9—9 of Fig. 3 looking in the direction of the arrows;

Fig. 10 is a fragmentary plan view of the direct view chart; and

Figure 11:
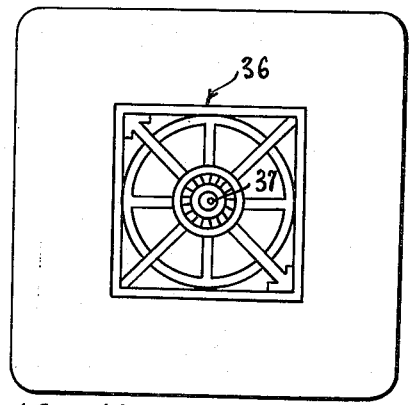

Fig. 11 is a plan view of the upper chart.

The presently described instrument has been conceived for determining and outlining areas of the central and paracentral visual fields of the eyes of an individual. The instrument operates on the principle of a stereoscope in which both eyes are simultaneously focused on separate fixation figures or charts which, when accurately positioned in the lines of sight of the eyes appear as a single image, which condition indicates fusion. The determining and outlining of the areas of the central and paracentral visual fields as to different colors is performed with both eyes fixed as stated above, which technique has been found to assist the patient in maintaining his eye under inspection in a more static state. Prior art instruments of this nature have generally embodied a test chart for each eye, which charts have been positioned in front of and at one or another or both sides of the instrument. Such devices rendered it difficult if not practically impossible for the practitioner to manipulate the test means preferably carried by a wand or similar means over the surfaces of the charts and to make notations on the charts during the inspection of a patient's eye.

The present invention overcomes this and other objections through the provision of a simplified arrangement wherein the test charts are so disposed that the practitioner has free and ready access thereto, thus making eye inspections of this nature considerably easier and faster to accomplish.

Figure 1:
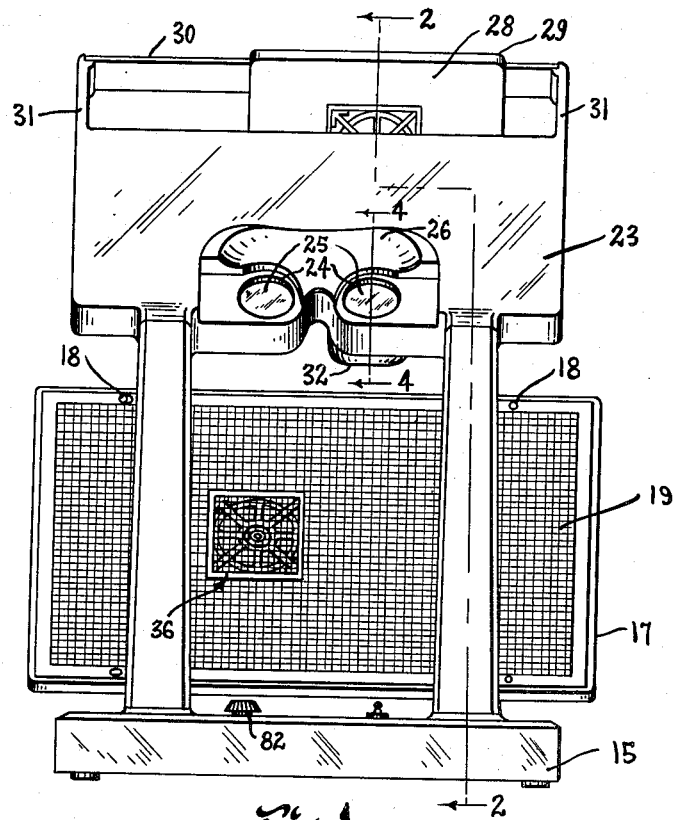
Fig. 1 is a front elevational view of an instrument embodying the invention.

Referring to the drawings, wherein like characters of reference designate like parts throughout the several views, a preferred embodiment of the invention includes a hollow base 15 (Figs. 1 and 2) having adjacent its rear edge a pair of spaced uprights 16 which support an inclined table 17 at their upper ends. The table 17 is provided adjacent its upper edge with retaining means such as a pair of spaced pins 18 on which is placed a test chart 19.

Adjacent the front edge of the base 15 are a pair of spaced hollow uprights 20 which are substantially longer than the uprights 16. The lower ends of the uprights 16 and 20 are preferably provided with externally threaded portions 21 which are adapted to extend through openings in the base 15 and to receive nuts 22 for securing them in position (Fig. 2).

The upper ends of the front uprights 20 carry a shield 23 which is inclined in a plane substantially parallel with the plane of the test chart 19 and table 17. The shield 23 is provided with a pair of spaced openings 24 (Figs. 1 and 4) in each of which is positioned a lens 25 through which a patient can view the test chart 19. A recess in the shield 23 immediately above the lenses 25 affords a cavity in which is positioned a head rest pad 26.

However, since the presently described instrument is designed to operate on the stereoscopic principle, before one of the lenses 25 is positioned reflecting means 27 for reflecting to one of the patient's eyes an image of a second test chart 28 which is carried by a plate 29 which is slidably adjustable transversely of the instrument along a slide bar 30 which is secured at its opposed ends to arms 31 projecting from the upper edge of the shield 23. The reflecting means 27 embodies a housing 32 which is designed to support a mirror 33 located in the field of vision of the patient. The mirror 33 may be secured within the housing 32 by suitable anchoring means such as clips 34 and screws 35. An image of the test chart 28 is transmitted by the mirror 33 to the patient's eye through the respective lens 25 which is positioned before it. Test chart 28 is so spaced with relation to the mirror 33 and lens 25, that the path of light between the chart 28 and lens 25 is substantially equal to the distance between chart 19 and lens 25.

The test chart 19 carried by the table 17 is provided with a predetermined arrangement of scales and lines (Fig. 10) whereby the color field or other pattern of a patient's vision may be identified and outlined. Both charts 19 and 28 are provided with small fixation inducing areas 36 (Figs. 10 and 11) which are identical with the exception of the minute fixation points 37 which are located slightly off-center. Thus, when the fixation points are viewed stereoscopically the areas 36 will fuse and the fixation object 37 will appear to be in a plane some distance beyond the image of the fused area 36.

In using the instrument the patient's eye, which views the test chart 19, may be tested by moving an object in controlled different directions within the field of vision while the eyes are constantly focused upon the respective fixation points 37. The patient may indicate when the object reaches a point where it disappears from view or when he can no longer distinguish its color, depending upon the type of test being made, and a mark then may be made on the chart 19 at each indicated point. By a series of such movements and markings in different directions, limits may be obtained indicating the outline of the particular field of the eye being plotted. In this type of instrument which employs binocular fixation, the eye not being tested aids the eye under examination in its endeavor to remain focused on the fixation point, an accomplishment which is more difficult when the eye not being tested is closed or unaided by binocular fixation.

It is to be understood that in testing a patient's left eye, for example, the reflecting means 27 will be positioned before the right eye on a bar 38 (Figs. 4 and 5) which is mounted in spaced relation with the rear surface of the shield 23 above the lens opening 24. The side walls 39 of the housing 32 are provided with aligned openings 40 through which the bar 38 is adapted to extend. The front wall 41 of the housing 32 is formed as a plate which is attached to the side walls 39 and slidably engages the front surface of the bar 38. A leaf spring 42 which is carried by one of the walls of the housing 32 has a portion thereof engaging the rear surface of the bar 38 and through its inherent tension maintains the reflecting means in adjusted position on the bar 38. It will be noted upon reference to Fig. 5 that the bar 38 has its opposed ends attached to spaced lugs 43 extending from the rear surface of the shield 23. The lugs 43 are so spaced with respect to the lens openings 24 that when the housing 32 has been slid along the bar 38 into engagement with one or the other thereof, the mirror 33 will be automatically properly positioned before one or the other of the patient's eyes.

Thus, in testing a patient's left eye the reflecting means will be slid on the bar 38 to a point where its travel is stopped by the right lug 43. This will position the mirror 33 so that the right eye will view the upper test chart 28. The left eye of the patient will simultaneously view the lower test chart 19 and the fixation inducing areas 36 will, when the patient looks at the fixation points 37, appear stereoscopically as a single image.

It is to be understood that the upper test chart 28 must be adjusted on the slide bar 30 to the position where it may be viewed properly by the patient's eye which is not being tested. This is accomplished by means of an elongated slide member 44 which is substantially U-shaped in cross-section (Figs. 2, 3 and 7) and is adapted to overlie the front and side surfaces of the bar 30 so as to slide longitudinally therealong. The bar 30 is preferably provided with beveled upper and lower edges, one of which is adapted to be positioned within a longitudinal groove in the upper side portion 45 of the slide member 44, the other beveled edge being positioned in a groove formed in a gib 46 which is positioned between the bar 30 and the lower side portion 47 of the slide member 44. A retaining plate 48 is attached as by screws 49 to the rear surfaces of said opposed side portions 45 and 47 and serve to retain the gib 46 in position. Adjusting screws 50 carried by the slide member 44 bear upon the gib 46 to clamp it firmly against the retaining plate 48 and other adjusting screws 51 carried by the lower side portion 47 of the slide member are employed to urge the gib 46 toward the slide bar 30 and can be adjusted to provide the desired amount of tension whereby the slide member 44 can move easily along the bar 30 but will still be maintained in adjusted position thereon.

The upper corners of the plate 48 are removed as shown in Fig. 3 and the edges 52 thus provided are used as indexing means which may be located with respect to a pair of spaced scales 53 on the rear surface of the slide bar 30. The scales 53 are preferably graduated in millimeters or prism diopters and are used to measure the horizontal abnormalities in the vision of the patient's eye not being tested, as will be more fully described hereinafter.

The slide member 44 is provided on its front surface with a pair of spaced lugs 54 and 55

(Figs. 2 and 3) which are provided with bores therethrough for receiving end portions of respective spaced guide rods 56 and 57. The guide rods 56 and 57 are firmly retained in place in the bores by holding means such as screws 58 and slidably carry a block 59 thereon. The block 59 rotatably carries a pivot member 60 which extends through the block 59 and is threadedly or otherwise securely connected to a connecting plate 61 which is in turn secured by screws or the like to the rear surface of the plate 29 which carries the upper test chart 28.

The block 59 is provided with a knob 62 which carries a collar 63 (Fig. 6) having one end of a shaft 64 secured therein as by screw 65 for rotation with said knob 62. The other end of the shaft 64 extends through the block 59 and into a cavity 66 formed therein and has a roller 67 fixedly secured thereto. The roller 67 has a concave periphery as shown in Fig. 6 and is adapted to engage the guide rod 57 which also extends into the cavity 66, with a flexible washer-like member 68 being screwed or otherwise attached to the end of the roller 67 for forced engagement with the guide rod 57. Thus, as the knob 62 is manually rotated the block 59 will be caused to move along the guide rods 56 and 57 due to the frictional engagement of the roller 67 and washerlike member 68 with rod 57. This will cause the connecting plate 61, plate 29 and upper test chart 28 to move up or down depending upon the direction of rotation of the knob 62. This adjustment compensates for vertical abnormalities in the visual axis of sight of the eye viewing the upper test chart 28 relative to the other eye and aids in permitting proper fusion. The block 59 is prevented from being accidentally moved off the guide rods 56 and 57 by a bar 57a which connects the free ends of the guide rods (Fig. 3).

A "normal" condition is assumed when the block 59 is located at a predetermined position on the guide rods 56 and 57. A leaf spring 69 (Fig. 8) attached as by screws 70 to the under side of the block 59 has a portion thereof spaced from the block 59 which carries a stud 71 thereon, the stud 71 extending through an opening in the block 59 and engaging the guide rod 56. The inherent resiliency of the spring 69 urges the stud 71 into constant engagement with the guide rod 56, the tension thereby created serving to maintain the block 59 in adjusted position on the guide rods. A shallow concavity is preferably formed on the guide rod 56 in such a position that when the block 59 is located at the "normal" position on the guide rods, the stud 71 will engage the concavity. The block 59, however, can be moved out of "normal" position by rotation of the knob 62 and the amount of movement is indicated by a scale 72 (Fig. 3) which is adapted to be read with an edge of a cut out portion 73 of the block 59 being used as an indicator.

To compensate for horizontal abnormalities, the entire upper test chart supporting structure can be moved along the bar 30 as described hereinbefore. The scale 53 for indicating the position of the test chart for viewing by the right eye, for example, is provided with a zero mark for indicating normal vision in a horizontal plane. Any deviation from the normal, however, will be indicated on the scale 53 when the chart 28 is adjusted so that it forms a true stereoscopic image.

When examining the right eye of a patient the lower test chart 19 must be removed from the pins 18, inverted, and subsequently replaced in inverted position on the pins 18. This will cause the fixation inducing area 36 thereon to be positioned before the right eye. At this time the reflecting means 27 must be slid along the supporting bar 30 to a position before the left eye, and the upper test chart 28 must be positioned on the bar 30 so as to be reflected by the mirror 33 into the left eye. However, since the fixation inducing areas 36 are provided with offset centers or fixation points 37, inversion of the lower test chart 19 must be followed by inversion of the upper test chart 28 in order that a true stereoscopic image may be produced.

Since the pivot member 60 which supports the plate 29 and upper test chart 28 is rotatably carried by the block 59, the plate 29 and chart 28 can be manually rotated 180° about the pivot member 60 which will thus permit the fixation inducing area thereon to fuse with the similar area on the lower test chart 19.

Means is provided for assuring retention of the plate 29 and test chart 28 in desired position and comprises a spring detent 74 (Figs. 3 and 9), embodying an opening 75 formed in the lower surface of the block 59 and having therein a ball member 76 which is adapted to engage one or another of a pair of diametrically opposed recesses 77 formed in the adjacent surface of the connecting plate 61. A coiled spring 78 within the opening 75 constantly urges the ball member 76 toward the connecting plate 61, and thus, as the operator of the device rotates the test chart 28 and table 29 about the axis of the pivot member 60, the ball member 76 will fall into a recess 77 and the operator will thus be able to properly position the test chart for the respective eyes of the patient.

It is to be understood that if desired means can be provided for enlarging the fixation points 37 in cases where this is necessary because of the poor eyesight of certain patients. Such means may be in the form of an enlargement of the central portions of the fixation inducing areas, which enlargements may be superimposed over the centers of said areas by suitable means.

Illuminating means is also embodied in the presently described structure and comprises a pair of lamps 79, one attached adjacent the upper ends of each of the front uprights 20 so as to illuminate both test charts 19 and 28. The wiring 80 for the lamps 79 is preferably located within the uprights 20 and base 15 as shown in Fig. 2 so as to be out of the way of both the operator and the patient.

In the lamp circuit is provided a rheostat 82 (Figs. 1 and 2) which can be manipulated to vary the intensity of the illumination.

The lenses 25 may also be provided with suitable filters or coatings 81 (Fig. 4) to provide certain conditions of viewing, such as by coating the surface of the lenses with a filtering material which will give to the patient a simulation of daylight or other conditions.

From the foregoing description it will be seen that novel means has been provided for accomplishing all of the objects of this invention.

While the novel features of the invention have been shown and described and are pointed out in the annexed claims, it will be understood that many changes may be made in the details of construction shown and described without departing from the spirit of the invention. I, therefore, do not wish to be limited to the exact details shown and described as the preferred only are set forth by way of illustration.

I claim:

1. A device of the character described comprising a base, an upright carried by said base, locating means carried by said upright embodying a pair of spaced openings having lenses therein and so located as to permit viewing therethrough by the eyes of a patient, holding means on said upright supporting a target at a location above said lenses and outwardly of the field of vision of the eyes when positioned before said lenses, retaining means on said base for supporting a target field within the direct vision of the eyes and in predetermined spaced relation with said lenses, and reflective means selectively positionable before a respective lens and so angled as to effectively produce an image of the target visible through the respective lens before which it is positioned and to simultaneously obliterate view of said target field through said respective lens, said holding means embodying a transverse arm having target carrying means slidably positioned thereon whereby said target is longitudinally adjustable along a line substantially parallel to said arm, said target carrying means comprising fixed guide means extending along a line lying normal to said line of longitudinal adjustment and a block member having a target carrying member attached thereto, said target carrying member having said target affixed thereto, said block member being adjustable lengthwise of said guide means whereby said target carrying member and target will be adjustable along said guide means while retaining their spaced relation with said reflective means.

2. A device of the character described comprising a base, an upright carried by said base, locating means carried by said upright embodying a pair of spaced openings having lenses therein and so located as to permit viewing therethrough by the eyes of a patient, holding means on said upright supporting a target at a location above said lenses and outwardly of the field of vision of the eyes when positioned before said lenses, retaining means on said base for supporting a target field within the direct vision of the eyes and in predetermined spaced relation with said lenses, and reflective means selectively positionable before a respective lens and so angled as to effectively produce an image of the target visible through the respective lens before which it is positioned and to simultaneously obliterate view of said target field through said respective lens, said holding means embodying a transverse arm having target carrying means slidably positioned thereon whereby said target is longitudinally adjustable along a line substantially parallel to said arm, said target carrying means comprising fixed guide means extending along a line lying normal to said line of longitudinal adjustment and a block member having a target carrying member attached thereto, said target carrying member having said target affixed thereto, said block member being adjustable lengthwise of said guide means whereby said target carrying member and target will be adjustable along said guide means while retaining their spaced relation with said reflective means, said target carrying member being rotatably attached to said block member whereby said target may be rotated for proper positionment with respect to said reflective means.

3. A device of the character described comprising a base, an upright carried by said base, locating means carried by said upright embodying a pair of spaced openings having lenses therein and so located as to permit viewing therethrough by the eyes of a patient, holding means on said upright supporting a target at a location above said lenses and outwardly of the field of vision of the eyes when positioned before said lenses, retaining means on said base for supporting a target field within the direct vision of the eyes and in predetermined spaced relation with said lenses, and reflective means selectively positionable before a respective lens and so angled as to effectively produce an image of the target visible through the respective lens before which it is positioned and to simultaneously obliterate view of said target field through said respective lens, said holding means embodying a transverse arm having target carrying means slidably positioned thereon whereby said target is longitudinally adjustable along a line substantially parallel to said arm, said target carrying means comprising fixed guide means extending along a line lying normal to said line of longitudinal adjustment and a block member having a target carrying member attached thereto, said target carrying member having said target affixed thereto, said block member being adjustable lengthwise of said guide means whereby said target carrying member and target will be adjustable along said guide means while retaining their spaced relation with said reflective means, said target carrying member being rotatably attached to said block member whereby said target may be rotated for proper positionment with respect to said reflective means, and spring means carried by said block member and in continuous engagement with said target carrying member whereby said target carrying member will be retained in adjusted rotated position with respect to said block member.

4. A device of the character described comprising a base, an upright carried by said base, locating means carried by said upright embodying a pair of spaced openings having lenses therein and so located as to permit viewing therethrough by the eyes of a patient, holding means on said upright supporting a target at a location above said lenses and outwardly of the field of vision of the eyes when positioned before said lenses, retaining means on said base for supporting a target field within the direct vision of the eyes and in predetermined spaced relation with said lenses, and reflective means selectively positionable before a respective lens and so angled as to effectively produce an image of the target visible through the respective lens before which it is positioned and to simultaneously obliterate view of said target field through said respective lens, said holding means embodying a transverse arm having target carrying means slidably positioned thereon whereby said target is longitudinally adjustable along a line substantially parallel to said arm, said target carrying means comprising fixed guide means extending along a line lying normal to said line of longitudinal adjustment and a block member having a target carrying member attached thereto, said target carrying member having said target affixed thereto, said block member being adjustable lengthwise of said guide means whereby said target carrying member and target will be adjustable along said guide means while retaining their spaced relation with said reflective means, and tension means carried by said block member and in continuous engagement with said guide member for aiding in retention of said block member in adjusted position on said guide means.

5. In a device of the character described, the combination of a support having a flat surface and means for holding in place thereon a target field having a fixation form, a shield member spaced therefrom and having a pair of sight openings provided with lenses through either of which said target field when in position on the surface of the support may be viewed, said device having a target carrier mounted to one side of said sight openings to carry a fixation form similar to that on said mentioned target field, and reflective means slidably mounted on said shield member for movement in directions transversely thereof so as to be selectively positionable before each sight opening, means for aligning said target carrier with said reflective means to permit one to view through said sight opening the fixation form carried by the target carrier when thereon and said reflective means substantially obliterating view through said opening of the target field whereby in the use of the device one eye of the patient is caused to see only the fixation form carried by the target carrier while his other eye is caused to see only the fixation form on the target field, together with means for adjusting said target carrier to permit said two fixation forms to be fused when viewed together by the patient.

6. In a device of the character described, the combination of a support having a target field with a fixation form of controlled character, a locating member spaced therefrom and having a pair of sight openings through either of which said target field may be viewed, a target carrier to one side of said sight openings and carrying a fixation form of similar character to that on said mentioned target field, reflective means slidably mounted on said locating member for movement in directions transversely thereof so as to be selectively positionable before each sight opening, and means for aligning the target carrier with said reflective means to permit a patient's eye when before said sight opening to view the fixation form carried by the target carrier, said reflective means substantially occluding view through said opening of the target field whereby one eye of the patient is caused to see only the fixation form carried by the target carrier and the other eye is caused to see only the fixation form on the target field, together with means for adjusting said target carrier through a plane approximately normal to the axis of the line of sight of the patient's eye as reflected by said reflective means to permit said two fixation forms to be fused when viewed together by the patient.

7. In a device of the character described, the combination of a support having means for holding in place thereon a target field having a fixation member of given form, a locating member spaced therefrom and having a pair of sight openings provided with lenses through either of which said target field when in position on the chart support may be viewed, a target carrier mounted to one side of said sight openings and adapted to carry a fixation member of form similar to that on said mentioned target field, reflective means carried by said device and selectively positionable before each sight opening, and means for aligning the target carrier with said reflective means to permit a patient's eye when before said sight opening to view therethrough the fixation member carried by the target carrier and said reflective means substantially obliterating view through said opening of the target field whereby one eye of the patient is caused to see only the fixation member carried by the target carrier while the other eye is caused to see only the fixation member on the target field, together with means for adjusting said target carrier through a plane approximately normal to the line of sight of the patient's eye as reflected by the reflector to the fixation member to permit said two fixation forms to be fused when viewed together by the patient, and scale and indicator means cooperating therewith to indicate the extent of adjustment required.

CHARLES A. ELLIS.

References Cited in the file of this patent

UNITED STATES PATENTS

| Number | Name | Date |
|---|---|---|
| 1,739,027 | De Zeng | Dec. 10, 1929 |
| 1,754,032 | McFadden | Apr. 8, 1930 |
| 2,003,165 | Wooten | May 28, 1935 |

FOREIGN PATENTS

| Number | Country | Date |
|---|---|---|
| 290,755 | Great Britain | May 22, 1928 |
| 326,053 | Great Britain | Mar. 6, 1930 |